LIGHT PEN OPERATING WITH REMOTE GRAPHIC DISPLAY led May 6, 1968 2 Sheets-Sheet 1

INVENTORS
JAMES C. MILLER AND
CHARLES M. WINE
BY Samuel Cohen
ATTORNEY

LIGHT PEN OPERATING WITH REMOTE GRAPHIC DISPLAY

Filed May 6, 1968 2 Sheets-Sheet 2

INVENTORS
JAMES C. MILLER AND
CHARLES M. WINE
BY Samuel Cohen
ATTORNEY 3,543,240

LIGHT PEN OPERATING WITH REMOTE GRAPHIC DISPLAY

James C. Miller, Pennington, and Charles M. Wine, Princeton, N.J., assignors to RCA Corporation, a corporation of Delaware Filed May 6, 1968, Ser. No. 726,743
Int. Cl. G06f 3/14
U.S. Cl. 340—172.5 8 Claims

ABSTRACT OF THE DISCLOSURE

A light pen causes a binary code to be generated when it senses the presence of light on the screen of a computer-controlled graphic display. The computer may be remote and may be of the time-shared type. The code is indicative of an address in the computer memory at which a character or characters corresponding to the portion of the graphic display at which the light pen is pointing is stored.

BACKGROUND OF THE INVENTION

A light pen such as described in B. M. Gurley and C. E. Woodward, "Light-Pen Links Computer to Operator," Electronics, pages 58–87, Nov. 20, 1959, can be thought of as a special kind of pointer used with computer-controlled cathode ray tube displays. It is an object about the size and shape of a fountain pen and includes a means for sensing light and means for converting this light to an electrical pulse. The pen is held in the hand and pointed at some portion of a picture, symbol, or the like being displayed on the screen of the cathode ray tube. When the electron beam which is tracing the image causes the portion of the screen next to the point of the pen to light up, the pen senses this light and generates an electrical pulse which serves as a computer interrupt signal.

The computer has a memory which stores the binary words which describe the picture being traced on the display. These words are read-out in sequence by the computer and applied to the graphic display. There, the words are translated to the deflection and intensity modulation signals which are necessry to cause the electron beam to trace the picture.

In general, the phosphor which makes up the screen is of relatively low persistence so that the picture has to be recreated (refreshed) at a rate sufficiently high that objectional flicker does not occur. If the computer provides the refresh information, it must be linked to the display by a relatively high bandwidth communications line.

At any instant in time, the computer is reading a particular location in its memory and concurrently the display is tracing the corresponding picture element. Therefore, if the interrupt request generated by a light pen is sent out immediately and the operation of the computer is interrupted immediately upon receipt of this request, the computer, when interrupted, is at the precise address of the binary word which corresponds to the picture element then being drawn on the cathode ray tube screen and at which the light pen is pointing. Under such circumstances, the modifications in the picture desired by the operator of the light pen readily can be made. For example, the operator, by appropriately programming the computer, may cause the information stored in that memory location to be altered so that the line being pointed at by the light pen will be erased. As another example, the light pen may be pointing at a tracking figure and the program selected by the operator may cause the tracking figure to move a certain amount in a certain direction. There are many other programs which could be followed.

The operation of the light pen as described above is perfectly satisfactory if: (a) the computer is located close to the display, (b) the interrupt produced by the light pen is granted priority over other interrupt requests, and (c) the bandwidth of the interconnection channel is sufficiently broad to permit the computer continuously to refresh the display to rapidly couple any interrupt signal back to the computer. However, many modern systems in which there may be a need for a device such as a light pen do not satisfy these requirements. For example, the computer may be a remote computer such as one of the time-shared type which may be located miles from the display. Here, the interconnection between the display and the computer may consist of a very narrow bandwidth channel such as an ordinary telephone line. And, it may not be convenient for the computer, if it is time-shared, to grant priority to one user over another.

In these systems, the usual method of operating the light pen simply does not work. The narrow bandwidth line interconnecting the display with the computer does not permit the computer continually to refresh the display. The relatively long distance between the computer and the display and the necessity for transmitting the interrupt request relatively slowly because of the narrow bandwidth of the interconnection channel, generally mean that the computer is at a step in its program beyond that corresponding to the light pen position at the time the interrupt request finally arrives at the computer. Alternatively, the computer may be running another user's program at the time the interrupt request arrives and it may not be convenient for the computer to interrupt this program and to grant priority to the light pen interrupt request. It may even be the case, in some instances, that the program for the display may be out of the computer's high-speed memory by the time the interrupt request generated by the light pen is received by the computer.

The object of the present invention is to provide a convenient and relatively inexpensive system for permitting a light pen at a remote display location such as one operated by a time-shared computer conveniently to interact with the computer.

SUMMARY OF THE INVENTION

In accordance with the invention, in response to a signal sensed by the light pen of a computer-controlled display, a coded manifestation indicative of a computer address is generated and sent to the computer. A step in the program corresponding to the part of the picture pointed at by the light pen is directly or indirectly stored at this address. This makes it possible for the computer, at a later time, to modify the information it is storing (causing a corresponding modification in the displayed picture) in the manner desired by the light pen operator.

DETAILED DESCRIPTION

Figure 1:
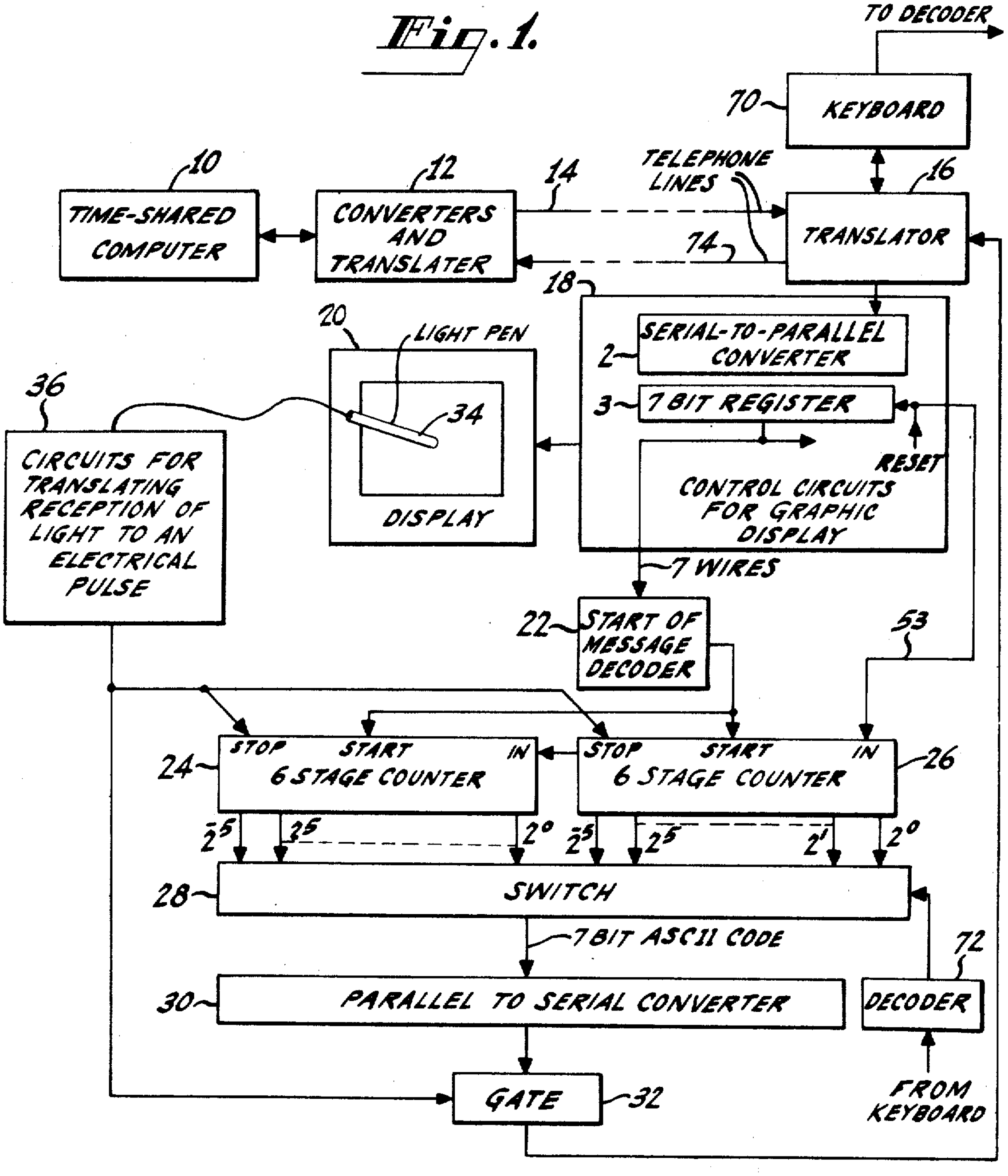
FIG. 1 is a diagram of the display system embodying the invention.

The system of FIG. 1 includes a time-shared computer 10 which has many different terminals only one of which is illustrated. The illustrated terminal includes a display system 18, 20, and a light pen 34 associated with the display. The output of the time-shared computer comprises parallel binary information which is generated at very high speed. This binary information is converted to serial form at block 12 and translated to audible tones which can be sent at relatively low speed, in serial fashion, over a narrow-band transmission line such as telephone line 14. In one form of the present invention, the transmitted bits comprise 8-bit ASCII characters (7 information bits and 1 parity bit).

At the far end of the telephone line 14, that is, at the user's location, there is a translator 16 for converting the audible information to electrical signals. These signals are applied to the system shown by way of example to consist of blocks 18 and 20. This system is a graphic display system which is described in detail in application Ser. No. 630,335, filed Apr. 12, 1967 by the present inventors and assigned to the same assignee as the present invention. The system is also described in an article by the present inventor, "A Simple Display for Remote Computer Graphics," 1968 International Solid State Circuits Conference, pages 76 and 77.

In the operation of the system 18, 20, the serial input information is converted by the serial-to-parallel converter 2 to seven bit characters. These are the seven bits of the ASCII character. The eighth or parity bit may be ignored for purposes of this explanation. Each such character can be an instruction character or an operation character. Instruction characters may, for example, indicate the start of a message, they may indicate that the picture being displayed should be erased, and so on. The operation characters indicate whether or not the electron beam of display 20 is to be intensified. They also indicate the direction in which the electron beam is to be moved and the angle through which the beam is to be moved. In other words, they indicate, in the case in which a line is being drawn, the length of the line and its direction.

The display 20 includes a storage-type cathode ray tube so that once a picture, symbol or the like is drawn on the screen of the display, it remains there, without fading, for an appreciable interval of time—a matter of an hour or more. Therefore, a local refresh memory is not needed nor does the display have to be continuously refreshed by the computer.

The control circuits 18 are connected to a start of message decoder 22 and the latter is connected to the start or reset terminal of two 6-stage counters 24 and 26. The counters are connected through a switch 28 to a parallel-to-serial converter 30. Note that each counter includes seven outputs—the $2^0$ through the $2^5$ bits in uncomplemented form and the $2^5$ bit in complemented form. This results in the conversion of the stored six-bit binary number to a seven-bit ASCII code. The converter 30 is connected through gate 32 to the translator 16.

The keyboard shown at 70 is for the purpose of enabling the user to communicate with the computer. The keyboard includes keys which, when they are depressed, cause signals to be generated which are indicative of the characters marked on the keys. Such signals are sent in serial fashion via translator 16 and telephone line 74 to the time-shared computer. As in the other cases discussed, the signals are transmited as audible tones over the line 74. The keyboard also includes a roll of paper on which is automatically printed out the information sent from the computer 10 via line 14. The key-board is a standard commercial product such as the Model 35 printer manufactured by the Teletype Corp.

The system shown in FIG. 1 also includes a light pen as shown at 34. The pen comprises a cylinder of the approximate shape of a fountain pen and includes a finger actuated switch. Within the pen may be a light detecting device such as a photodiode. As an alternative, the light detecting device may be in block 36 and the connection between the light pen and this device may be via a fiber optics bundle. In this case, the switch may in fact be a light shutter control element or it may be an electrical switch on the chassis of block 36.

In the operation of the light pen, the point of the pen is placed against the face of the cathode ray tube and the switch is depressed. If a picture is then being drawn on the screen, when the area of the picture adjacent to the point of the pen lights up, the pen detects this light and the circuits 36 associated with this pen produce a pulse of relatively high amplitude. In the conventional operation of the light pen, this pulse serves as an interrupt request for a computer located close to the light pen.

The computer, upon receipt of the interrupt signal, interrupts its operation at the point in the stored program corresponding to the place on the screen of the cathode ray tube at which the light pen is pointing. The computer then, under program control, causes some operation to be performed on the cathode ray tube screen in accordance with the light pen operator's desires. For example, the computer may cause the line at which the pen is pointing to be erased. A second common operation the computer may command is the drawing of a line which traces the movement of the light pen. There are many others.

In the system of the present invention, the computer is remote and, for reasons stated briefly in the introduction, it is inconvenient and many times impossible for its operation to be interrupted at the precise time the light pen produces a pulse. Instead, in the present system, when the light pen produces a pulse, the circuits 36 stop the counters 24 and 26 and prime the gate 32 so that the gate will apply the signals indicative of bits produced by parallel-to-serial converter 30 to the translator 16.

Figure 2:
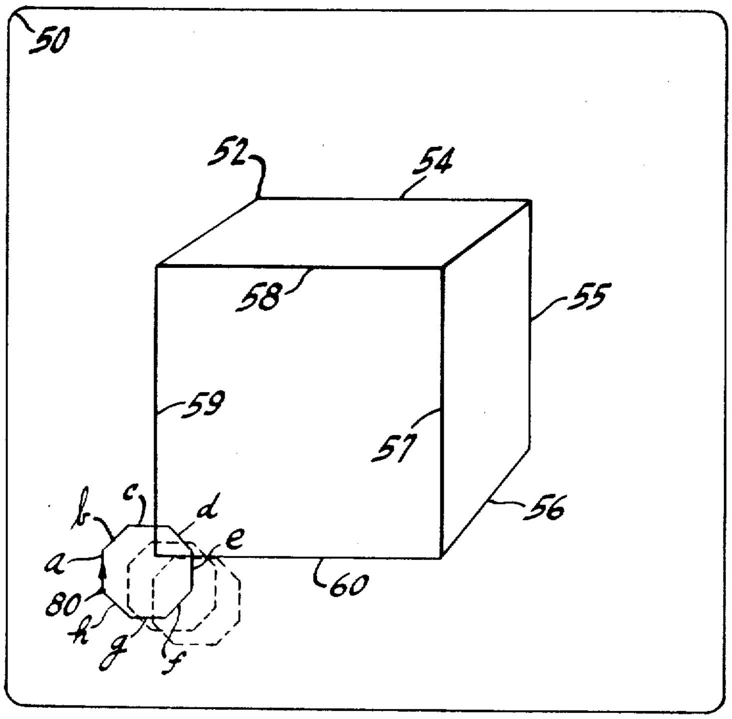
FIG. 2 is a sample display as drawn on the screen of the cathode ray tube.

In the operation of the system of the present invention, assume that the time-shared computer is causing the system 18, 20 to draw a simple figure, such as the cube shown in FIG. 2, on the screen of the cathode ray tube. The instructions for drawing such a figure will be stored in successive storage locations of the main memory of the computer 10.

At this point, a digression may be in order to explain how information is actually stored in the memory of the computer and how, for purposes of simplifying the discussion, it will be explained in the present application. In one way of operating the system, in one area of the main memory of the computer there may be stored what may be termed macro-instructions in a machine code-one other than ASCII code, which may, in fact, be addresses to other areas of the memory. For example, for the program "Draw a Cube"—the program for the picture of FIG. 2, as a first step, the computer may address one memory location. That memory location may have an address of a second group of memory locations in what may be termed the "file" for the program "Draw a Cube." In reading out this file, the computer is programmed first automatically to send a start of message signal even though it may not be stored in this file. Then there may be extracted from the first group of memory locations a group of ASCII characters which, when translated by the graphic display system 18, 20 indicate that the electron beam is to be moved from location 50 to location 52 without being intensified.

In another possible way of operating the system, the "file" may contain, in machine language, information concerning the coordinates (points) on the screen between which it is desired that the beam move and information as to whether the beam is to be on or off. This information may then be operated on in the arithmetic circuits of the computer, in response to stored program instructions, to generate the ASCII characters which must be sent back to the display system 18, 20.

In the particular graphic display system illustrated, movement of the electron beam can occur in only one of eight different directions. If the movement from 50 to 52 is not in one of these eight directions, it may require a number of ASCII characters which, for example, may tell the beam first to move along a horizontal line and then to move downwardly along a vertical line. As an alternative, in the case in which the beam is to be intensified, the movement along an intensified line 50–52 may be caused to occur by perhaps 20 or 30 different ASCII characters (stored directly or indirectly in 20–30 successive locations of the "file") each of which causes a short amount of movement in a particular direction so that overall a zigzag line is drawn between 50 and 52. Because the zigs and zags are extremely short, this line appears to the eye of the observer as a straight line.

In response to a second step in the program, the computer may address a second memory location in the first area of the memory. Located there may be an address of a second group of memory locations in the file, which addresses directly or indirectly contain the ASCII codes for drawing the line 54 and so on.

Since all of these details are not of concern in connection with the present invention, a simpler mode of operation will be assumed to simplify the discussion. It will be assumed that all addresses store ASCII characters rather than having some store indirect addresses and or coordinate information in machine code characters, as is actually the case. It will also be assumed that there is a one-to-one correspondence between a stroke on the screen and a memory location. In the example of FIG. 2, the first storage location of program "Draw a Cube" is assumed to store the "start of message" character. The second storage location is assumed to store a single ASCII character which commands the electron beam to move say from position 50 to position 52 and, during such movement, to remain blank. The third storage location in the memory may be assumed to contain a single ASCII character which commands the system 18, 20 to draw the line (commonly termed a vector) 54. The following locations may be assumed to contain characters indicating that the vectors 55–60 be drawn and so on.

In view of the discussion above, it is to be understood that when a memory address is hereafter referred to the term is meant to be generic to a place in the memory which contains only a single character which results in a line being drawn on the screen of the display and the address of a number of locations, each containing ASCII or other character information for a micro-operation, and all of the ASCII or other characters, taken together, being required to cause a line or some other small portion of a picture to be drawn.

With the above introductory explanation in mind, assume that the light pen is pointing at vector 55 and that the computer has been instructed to transmit again the characters indicative of the cube displayed on the screen as shown in FIG. 2. The computer, in time-shared fashion, will send to the display system 18, 20, successive seven bit characters indicative of the following commands: (1) Start of message. (2) Move the electron beam from point 50 to point 52 without intensifying the beam. (3) Draw vector 54. (4) Draw vector 55. (5) Draw vector 56 and so on.

In response to the first character transmitted, that is, the start of message character, the decoder 22 will produce an output which clears counters 24–26. Counter 26 is a 6-stage fine counter. It counts from 1 to 64 and then is reset back to 1. The 6-stage counter 26 also includes within block 26 a "count of 64" decoder and each time the count of 64 is reached, the decoder produces a pulse which it applies to counter 24. For the present, counter 24 may be ignored. It is needed only when the figure being drawn is complex and requires more than 64 computer commands.

Immediately before each new character is received by the control circuits 18, a reset signal is internally generated which resets the seven bit register 3 (see the co-pending application for the details of the circuits which are involved). This reset signal therefore may be used as a count of the characters. When the start of message decoder 22 sets the counter, the convention may be adopted that the counter is at a count of 1. When the first character of the message arrives, which causes the electron beam to move from position 50 to 52 and to remain unilluminated, the counter 26 receives a pulse via line 53 and its count advances to 2. At vector 54, the count advances to 3, at vector 55, the count advances to 4.

It has been assumed, it will be recalled, that the light pen is against the screen and pointing to vector 55, and that the light pen switch is depressed. When vector 55 is drawn, the light pen registers a "hit." In other words, the light pen produces an output pulse which causes the circuits 36 to stop the counters 24 and 26. At this time, the count 4 is stored in counter 26 and the count of 0 is stored in counter 24) and this means that the hit occurred at program step 4.

It should be mentioned here that the switch connects both counters to the converter 30. Such connection may be achieved by causing the keyboard 70 to apply a character to the decoder 72 at the start of the light pen operation. This character causes a flip-flop within stage 28 to become set and to apply an appropriate direct voltage level to the switch for the duration of this mode of light pen operations.

The parallel-to-serial converter includes means for sequentially converting first the output of counter 26 to serial form and then the output of counter 24 to serial form. The parallel-to-serial converter, in other words, produces two 7-bit ASCII characters in succession. (The eighth or parity bit is ignored for purposes of the present description.)

The bit produced by the light pen is translated by the circuits 36 to an enabling signal which actuates gate 32 for as long as the time required for the parallel-to-serial conversion. Circuit 36 may, for example, include a pulse translating circuit such as a monostable multivibrator for producing a pulse of the desired duration.

The serial bits passing through gate 32 are translated at 16 to audio pulses and applied to the telephone line 74 which leads back to the block 12. The latter includes a circuit for translating the serially occurring audio pulses to serially occurring electrical pulses and for converting serially occurring electrical pulses into parallel, 7-bit words. The latter are applied to the time-shared computer 10.

The computer stores the bits it receives in a temporary buffer and is programmed to operate on these bits at a time convenient to the computer. (A more detailed discussion of the operation of this buffer is given later in connection with the program "Track.") By the time the computer receives these bits it may be drawing some much later stroke in the picture it is displaying on the display 20 or it may be servicing some other user. However, within a short time, usually only a fraction of a second, the computer does return control to the program of the light pen user and examines the characters in the temporary buffer. These characters comprising the state of counters 24, 26 are interpreted by the light pen program as a "pointer" to a memory "location" corresponding to the vector of interest. In the present example, this is the memory location storing step 4 of its program "Drawing a Cube." Recalling the previous discussion, location 4 may contain an address in machine language, of one or more successive locations in the file which contain the ASCII code or codes necessary to cause the line 55 to be drawn.

What the user wishes the computer to do with the word stored at this location is communicated to the computer by an appropriate program of instructions. In one mode of operation, after a light-pen "hit" has been registered, the user depresses certain keys on the keyboard 70 to signal the computer what function it desires the computer to perform. As one example, the user may, by means of keyboard 70, instruct the computer to change the value of the binary word stored at the location storing step 4 of the program "Drawing a Cube" to one which indicates that the electron beam is to be blanked during its movement along vector 55. This may involve reading the character or characters corresponding to program step 4 from memory, modifying the character or characters in the way desired in, for example, the arithmetic unit of the computer, and then returning the modified character to the same location in memory. The user may also instruct the computer to redraw the figure in its amended fashion. The computer, when it does this, will draw the cube as shown except that line 55 will be missing. The instructions to the computer, of course, can be much more complex than this, however, as the operation of the light pen in these other ways is well understood, these details need not be discussed here.

It may be that the figure being drawn is extremely complex and may, for example, include several hundred or even several thousand strokes. Here, the two counters 24 and 26 will be of value. In such case, the program steps supplied by the computer 10 to the system 18, 20 will be subdivided into blocks of 64 steps per block. Now the counter 24 will keep track of the program block and the counter 26 will keep track of the step within the block. For example, a "hit" may be obtained by the light pen at block 12, step 19 of a complex program. This information will be transmitted back to the time-shared computer and at this point it may be convenient for the user to instruct the computer to erase all of the picture except that corresponding to block 12 of the program and then continuously to draw block 12 of information. Now the computer will cause only a small part of the complete display, that corresponding to block 12 of the program, to be drawn on the screen of the cathode ray tube and, as a matter of fact, it may do this, if so instructed, on an enlarged scale. Now the user may point to the line defined by a program step within this block to indicate to the computer the particular program step within block 12 that he desires to operate on.

As an alternative to the above, the complete picture need not be erased. Instead, the computer can be instructed to cause the block of data to be sent in such manner that the line of interest is continuously traced first in one direction (reading the block in ascending sequence) and then in the opposite direction (reading the block in decending sequence).

In the operation of a light pen, the use of tracking figures such as the octagon *a*, *b* . . . *h* shown in FIG. 2 is often convenient. The operator can, by pointing to one edge of the octagon, cause the octagon to jump discrete amounts in a given direction. For example, the computer may be programmed to cause the octagon to move in the southeast direction in successive increments when the light pen points at side *f* of the octagon.

Operation in this manner is also possible with the system of the present invention. In such operation, the information typed into the keyboard indicates both to the computer and to the decoder 72 that the "track" mode of operation is desired. In response to this instruction, the detector 72 connects only the fine counter 26 to the parallel-to-serial converter 30. The computer is informed that it need consider only a single ASCII character rather than two such characters.

In the operation in this mode, when the user by means of the keyboard 70 commands the computer 10 to send the octagon and track it (program "Track"), he places the light pen adjacent to the edge of the tracking octagon indicative of the direction of movement of the tracking octagon he desires and he depresses the switch on the light pen. The computer sends out the successive characters which define the octagon and these are converted by the system 18, 20 to the information necessary to deflect the electron beam of its storage tube. (To prevent the octagon from being stored on the screen, the electron beam is wobbled at high frequency as the octagon is being drawn so that the beam does not remain in one spot for any appreciable interval.) The successive characters may correspond to the following successive commands: (1) Start of message. (2) (Assuming the electron beam is at position 80 initially). Draw vector *a*. (3) Draw vector *b*. (4) Draw vector *c*. (5) Draw vector *d*. (6) Draw vector *e*. (7) Draw vector *f*, and so on. The message may, if desired, end with "end of message" character.

In response to a "hit" detected by the light pen at vector *f*, a single character is sent back to the computer 10 indicative of the count stored in counter 26. This character may be chosen from among the little used characters such as "[" or "α" or "]" and so on. (The conversion of the count to such a character may be carried on by a code conversion stage within translator 16 in response to the instruction for program "Track" previously typed at the keyboard 70.) In response to this character, the time-shared computer, under program control, will cause the string of operation characters defining the octagon to be transmitted again, but only after having changed the electron beam starting position (with beam off). It does this by incrementing the counts in the system 18, 20 in the desired amount and sense (see the co-pending application for the details of these counters).

Again the above is only a simplified version of what actually occurs. In practice, in the time-shared computer system there is a buffer for the present terminal, as already mentioned, and also buffers for the remaining terminals of the system. The system scans these buffers in succession to see whether any user desires to be serviced. If the user does desire servicing, the computer allots to him an amount of computer time up to say a fraction of a second and then continues the scanning of the buffers. In the program "Track," each time the computer reaches the buffer for the light-pen user, if there are no new instructions, the computer will send tracking octagons for the entire fraction of a second allotted to the user. For purposes of the present explanation, it may be assumed that the computer sends ten such octagons during each such fraction of a second allotted to the user.

Assume now that the light-pen user has placed the pen next to an edge of the tracking octagon and that the time-shared computer is sending octagons for the entire fraction of a second. Now, rather than registering a single hit, ten such hits will be registered during the fraction of the second. Due to the various delays in the system including the time necessary to cause the counters to advance, the time necessary to translate the counter output to serial output, and the time necessary to transmit this serial information to the compuer, by the time the time-shared computer reaches the buffer assigned to the present system, many hits may be stored in this buffer. It may be that ten or twenty or thirty hits are stored there.

In response to this information stored in the buffer, the computer will send to the system 18, 20 the same number of counter incrementing commands. For example, if there are ten hits for side *f* of the octagon, the computer will command the octagon to move ten increments in the southeast direction. However, to enable the light-pen user continuously to track the octagon, these increments are made extremely small. The octagon therefore appears to move continuously at a relatively slow rate and the light-pen user readily can follow this movement.

In a modified form of this system, after a hit is obtained, the light-pen and counters may be inactivated for a relatively short interval of time to prevent the accumulation of too many hits. Inactivation of the light-pen circuit may be achieved by a feedback circuit within block 36 which disables the electric pulse producing circuit for the desired interval. The counters may be effectively disabled by placing the gate in series with the line 53 and disabling this gate for a short interval each time the hit is registered. Other modifications are also possible.

While the invention has been described in terms of a display system which does not need a refresh memory since it employs a storage type cathode ray tube, it is to be understood that the invention is applicable to any type of display system. It is applicable, for example, to systems which use refresh memories such as core memories, delay lines, disk files and so on. The principle of the invention remains the same and that is to send to the remote computer in response to a signal produced by a light pen not an interrupt request and not the coordinates of the display at which the information of interest is located, but rather a character indicative of an address in the memory, either direct or indirect, which contains the step in the program corresponding to the portion of the picture at which the light pen is pointing. As an example of the superiority of this method over, for example, sending the actual coordinates of the screen at which the information of interest is located, in the latter case all of the memory locations would have to be examined and compared with the coordinates transmitted by the light pen. This would be extremely time consuming and, in addition, would require the equipment necessary to translate a "hit" into coordinate information.

While the invention has been described in connection with a time-shared computer, it is to be understood that it is applicable to any remote display system which is linked to its information source, such as a computer with a broad bandwidth transmission channel or a narrow bandwidth channel such as a telephone line.

What is claimed is:

1. In combination:

a local graphic display system including a screen and means for translating coded characters applied to said system to graphic information which is displayed on said screen;

a remote computer linked to said display system via a relatively narrow-band transmission path for supplying successive coded characters to the system indicative of the graphic information to be displayed on said screen;

means at the display system location for producing an output signal at a time corresponding to that at which a particular part of the information displayed on the screen is being drawn on the screen;

means at the display system location for translating said output signal into coded data indicative of where in the sequence of characters being supplied by the computer the one corresponding to said particular part of the information displayed on the screen occurs; and means for transmitting said coded data to said computer via said relatively narrow-band transmission path.

2. In combination:

a graphic display system including a screen and means for translating coded characters applied to said system to graphic information which is displayed on said screen;

a remote computer of the stored program type linked to said graphic display system via a transmission path, said computer including a memory for storing the coded characters of a program, which characters together define the graphic information the computer can be called upon to supply to said graphic display system and said path including means for translating the characters supplied by the computer to serially occurring bits for transmission via said path to said graphic display system;

means at the graphic display system location for signalling the computer to supply to said system said program;

means at the graphic display system location for producing an output signal at a time corresponding to that at which a particular part of the information displayed on the screen is being drawn on the screen;

means at the graphic display system location for translating said output signal into coded data indicative of the address in said memory at which the step in the program corresponding to said particular part of the information displayed on said screen, is stored; and means for serially transmitting said coded data via said path to said computer.

3. In the combination set forth in claim 2 said translating means comprising:

a counter;

means for advancing the counter in response to each step in the program supplied by the computer; and means responsive to said output signal for stopping said counter.

4. In the combination set forth in claim 2, said computer being one of the time-shared type.

5. In combination:

a graphic display system characterized by a given intrinsic operating rate and having a screen;

a computer which is remote from the graphic display system for supplying the information required for causing said display system to display visible information on its screen;

a transmission channel connecting the computer to the display system for carrying the computer information to the display system, said transmission channel having an information capacity which is substantially smaller than that required for carrying information at said intrinsic operating rate of said display system;

a light pen associated with said display system for producing an output when it is pointed at a place on said screen which lights up; and means at the display system location coupled between said light pen and said computer via said transmission channel for translating said light pen output to signal information intelligible to said computer and which said channel is capable of transmitting, indicative of the place on the screen of said display system at which the light pen is pointed.

6. In combination:

a graphic display system including a screen and means for translating coded characters applied to said system to graphic information which is displayed on said screen;

a computer linked to said display system for supplying successive coded characters to the system indicative of the graphic information to be displayed on said screen;

means at the display system location for producing an output signal at a time corresponding to that at which a particular part of the information displayed on the screen is being drawn on the screen;

means at the display system location for producing a count of the number of said coded characters received from said computer up to the time said output signal is produced; and means for transmitting said count to said computer for indicating to the computer the coded character corresponding to said particular part of the information.

7. In the combination as set forth in claim 6, said graphic system being at one location and said computer being at a remote location, and the path between said computer and said graphic display system comprising a relatively narrow-band transmission path.

8. In the combination as set forth in claim 6, said means for transmitting said count to said computer including means for translating said count to serially occurring bits, and means for transmitting said serially occurring bits.

References Cited

UNITED STATES PATENTS

| | | | |
|---|---|---|---|
| 3,337,860 | 8/1967 | O'Hara | 340—172.5 X |
| 3,346,853 | 10/1967 | Koster et al. | 340—172.5 |
| 3,382,487 | 5/1968 | Sharon et al. | 340—172.5 |
| 3,396,377 | 8/1968 | Strout | 340—172.5 X |
| 3,399,401 | 8/1968 | Ellis et al. | 340—172.5 X |
| 3,402,395 | 9/1968 | Culler et al. | 340—172.5 |
| 3,413,515 | 11/1968 | Haring | 340—172.5 X |

PAUL J. HENON, Primary Examiner

R. F. CHAPURAN, Assistant Examiner

U.S. Cl. X.R.

340—324